United States Patent

[11] 3,557,338

[72] Inventor  Don E. Ehrlich
              Avon, Ohio
[21] Appl. No. 563,914
[22] Filed     July 8, 1966
[45] Patented  Jan. 19, 1971
[73] Assignee  TRW Inc.
              Cleveland, Ohio
              a corporation of Ohio. by mesne
              assignments

[54] APPARATUS FOR WELDING PARTS TO WORKPIECES
     12 Claims, 15 Drawing Figs.
[52] U.S. Cl. .................................................. 219/98,
                                                  219/78, 219/103
[51] Int. Cl. ................................................ B23k 9/20
[50] Field of Search ............................................ 219/98, 95,
                                                              103, 158

[56]                 References Cited
                  UNITED STATES PATENTS
2,439,830  4/1948  Varela ........................... 219/98

1,635,536  7/1927  Butler ........................... 219/80(X)
1,769,148  7/1930  Lunn ............................ 219/80
2,847,557  8/1958  English ......................... 219/98
3,312,810  4/1967  Neumeier ....................... 219/103(X)

OTHER REFERENCES
   M. M. Mintz, " Welding Machine-Stud Feed," IBM Technical Disclosure Bulletin, Voll No 2 Aug. 1958 pg 17

*Primary Examiner*—J. V. Truhe
*Assistant Examiner*—R. E. O'Neill
*Attorneys*—Philip E. Parker and James R. O'Connor, John Todd, Hall & Houghton and Gordon Needleman ABSTRACT: Apparatus is provided for welding parts to workpieces at a high rate, in the order of 250—300 parts per minute The apparatus includes a unique arrangement for supplying the parts to the chuck of the welding tool and a mechanical arrangement for coordinating the operation of the tool and the part supply. The entire operation of the tool is also controlled mechanically, including mechanical means for timing the pilot and welding arcs of the welding cycle.

PATENTED JAN 19 1971
3,557,338
SHEET 1 OF 4
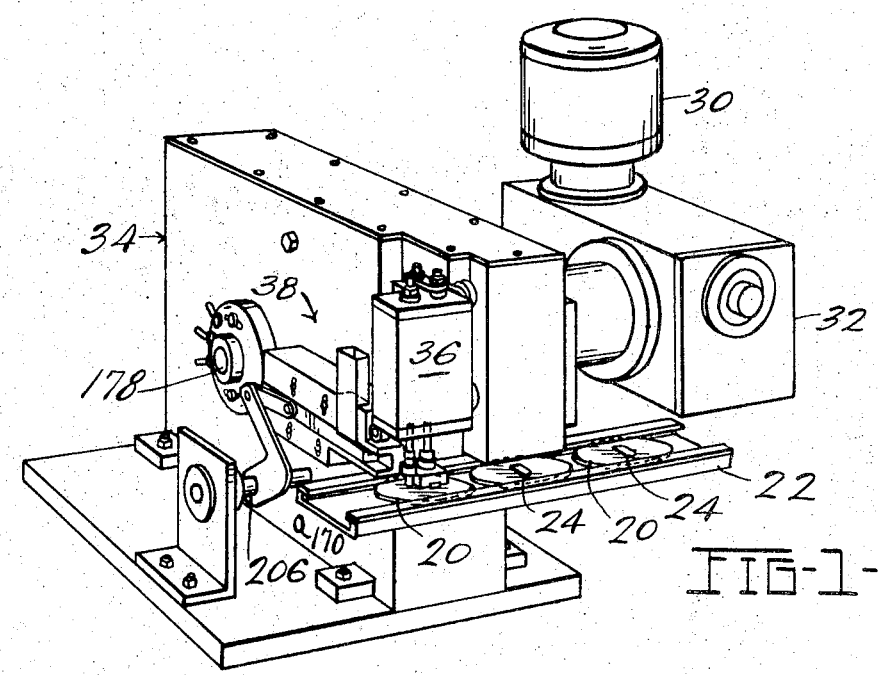
FIG-1-
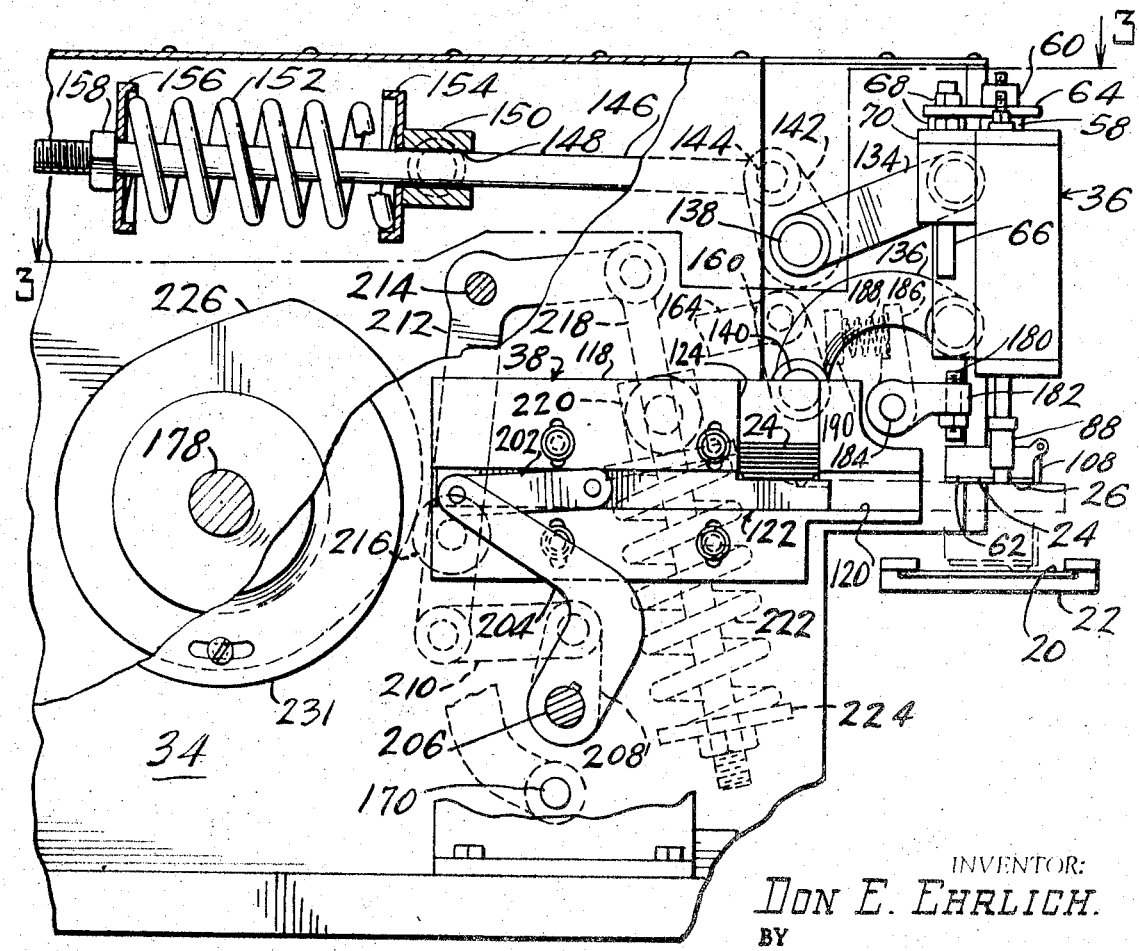
FIG-2-
INVENTOR:
DON E. EHRLICH.
BY
Owen & Owen
ATT'YS.

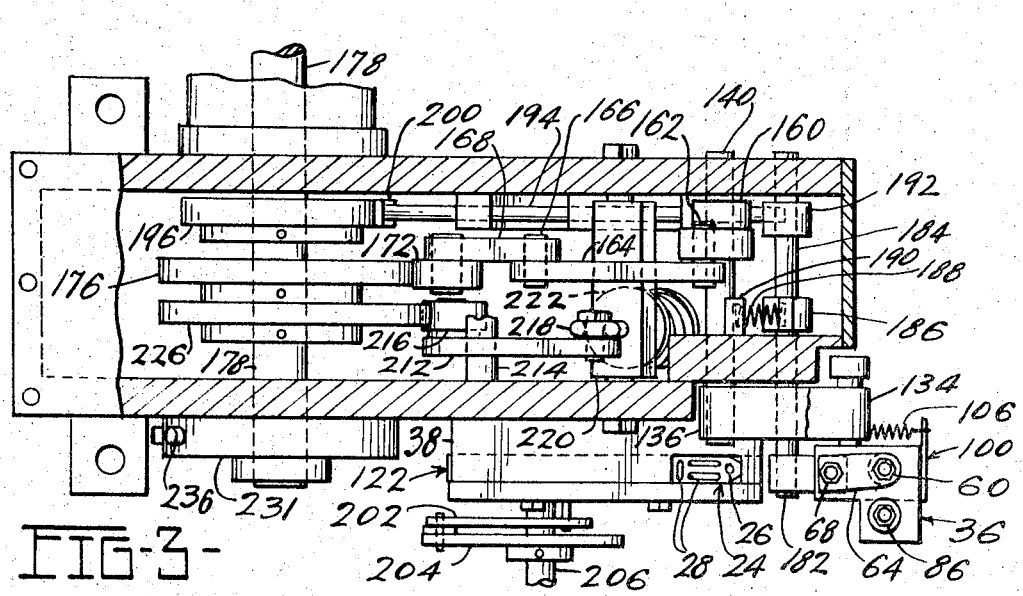
FIG-3-
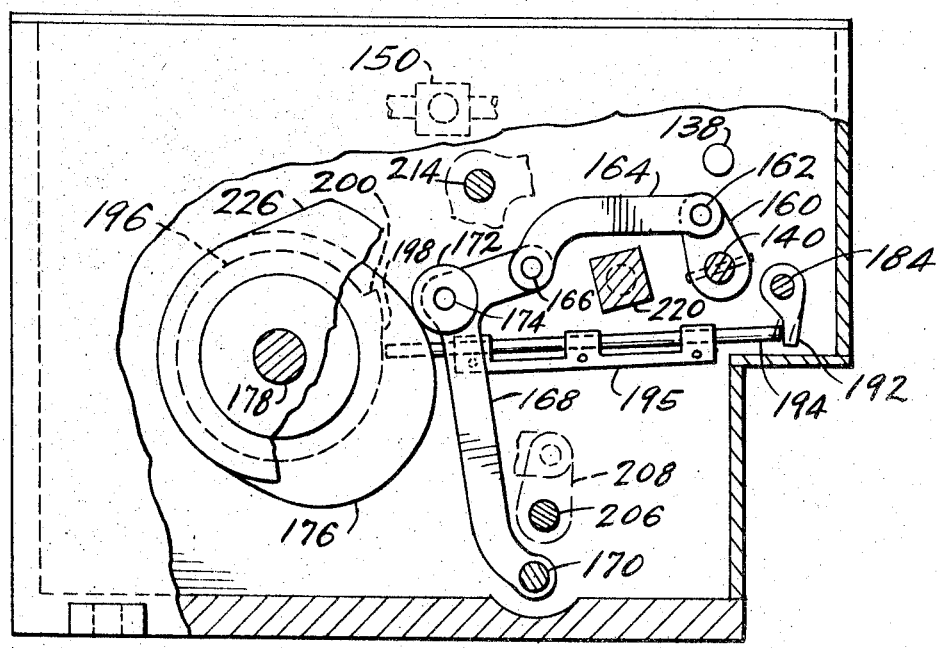
FIG-4-
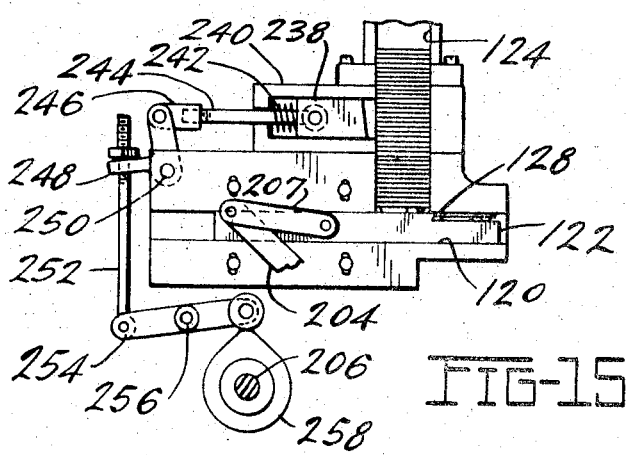
FIG-15-
INVENTOR:
DON E. EHRLICH.
BY
Owen & Owen
ATT'YS.

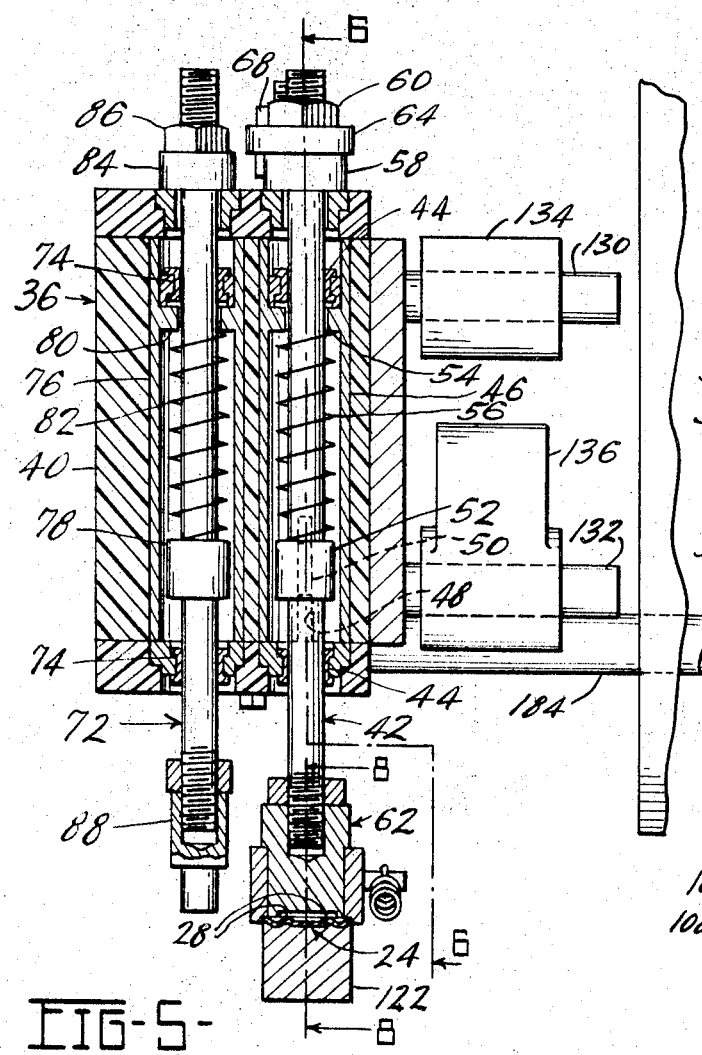
FIG-5-
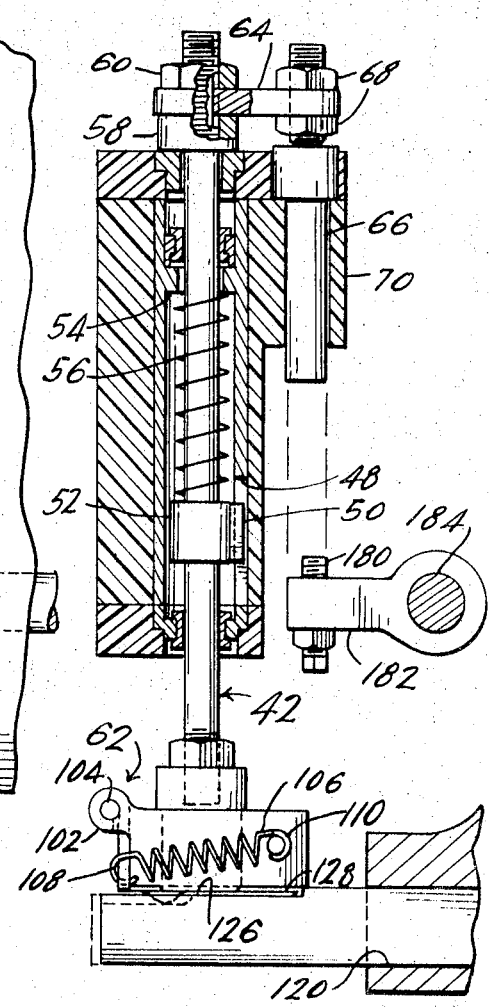
FIG-6-
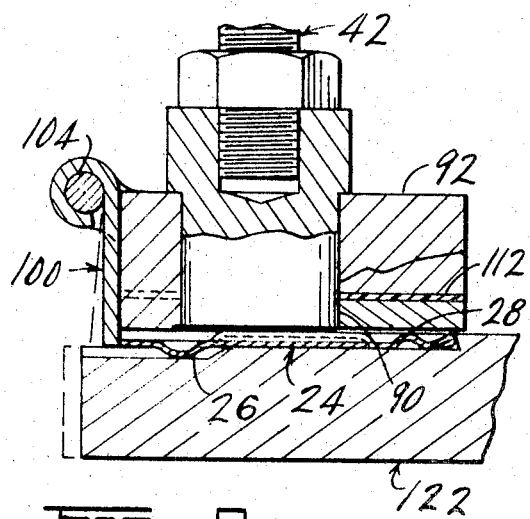
FIG-8-
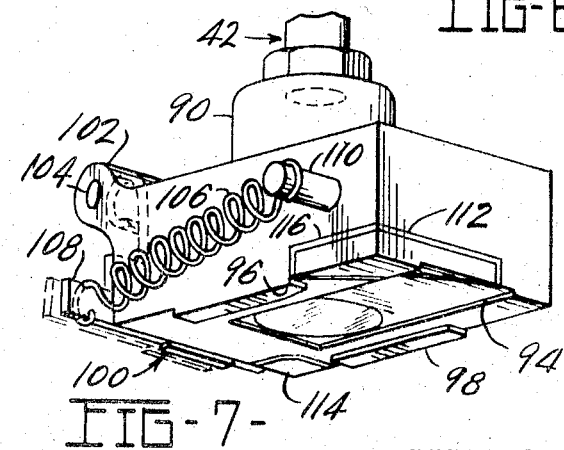
FIG-7-
INVENTOR:
DON E. EHRLICH
BY
Owen & Owen
ATT'YS.

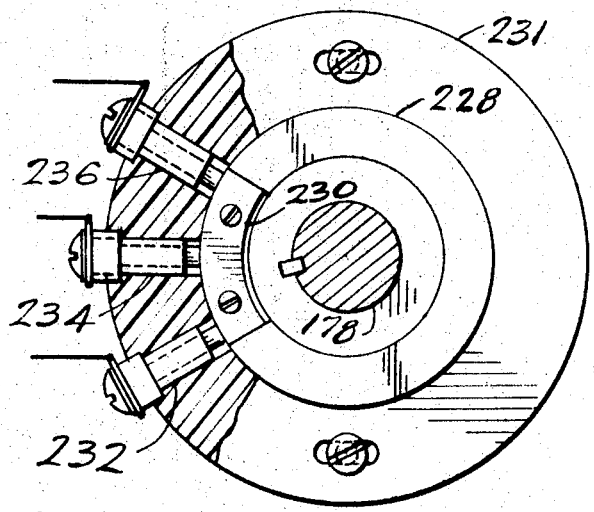
FIG-9-
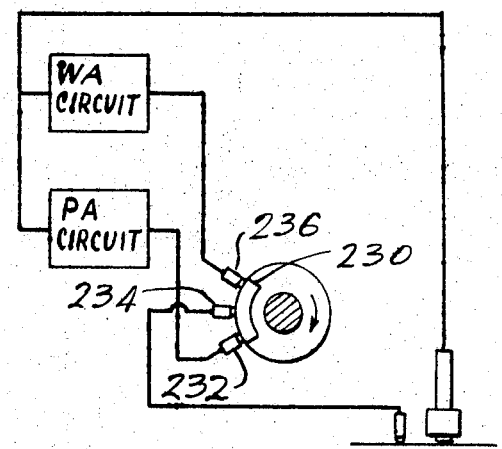
FIG-10-
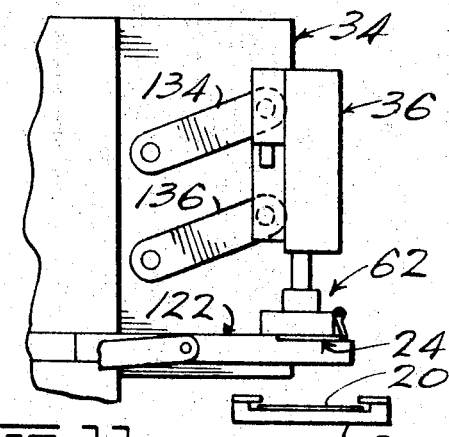
FIG-11-
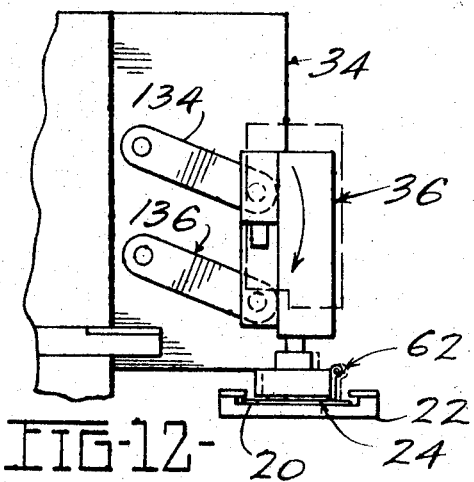
FIG-12-
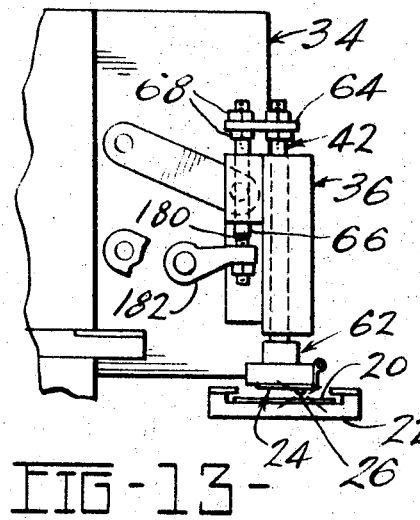
FIG-13-
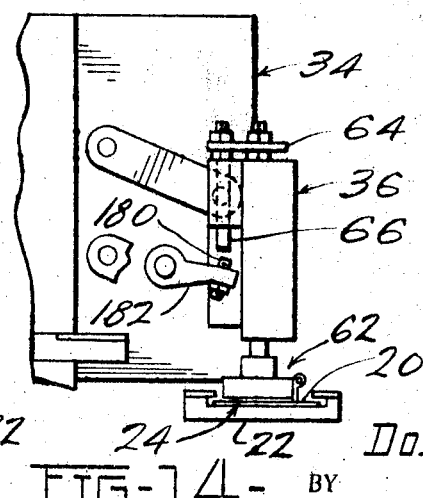
FIG-14-
INVENTOR:
DON E. EHRLICH.
BY
Owen + Owen
ATT'YS.

3,557,338

APPARATUS FOR WELDING PARTS TO WORKPIECES

This invention relates to apparatus for welding and particularly for welding parts to workpieces at a high rate of speed.

In welding parts and specifically studs to workpieces, the part is first inserted in a chuck of a welding tool and is then moved into contact with the workpiece. Power is then supplied to the part and the workpiece with the part immediately withdrawn from the workpiece to establish a pilot arc therebetween. When the part is retracted to a predetermined position, a main welding arc is effected between the part and the workpiece with the part then plunged against the workpiece to complete a weld therebetween.

In this type of welding, commonly known as end welding or stud welding, studs usually have been welded to workpieces at a rate of three or four a minute, with the rate increased to seven or eight studs a minute under some circumstances. Heretofore, however, the maximum rate at which the studs could be welded was limited by the time required for the operator to load the studs in the welding tool chuck, the time required to complete the welding cycle, and the ability of the welding power source to again reach peak power for another welding cycle after establishing the pilot and main welding arcs of the last cycle. More recently, with the development of automatic stud or part feeding systems, and with improved power sources, small studs have been able to be welded at rates as high as 50 to 60 per minute.

The present invention relates to apparatus for welding parts at even substantially higher rates than those heretofore achieved. The new apparatus is capable of welding studs or parts at continuous rates as high as 250—300 per minute. This has been accomplished by unique means for operating the welding tool including supplying the parts to be welded to the tool, moving the tool from a remote, part-receiving position to a position in which the part is in contact with the workpiece, and moving the chuck of the tool and the part to be welded from the position in contact with the workpiece to a retracted position and back again to the workpiece during the actual welding cycle. The entire operation of the tool is controlled mechanically, including mechanism for moving the tool between the part-receiving position and the position in which the part is in contact with the workpiece and mechanism for moving the chuck and the weldable part from the position in contact with the workpiece to the retracted position during the welding cycle. In addition, the apparatus includes mechanical means for timing the pilot and welding arcs and also for feeding a weldable part to the chuck when the tool is in the remote position. In a preferred form of the invention, the welding tool is moved in an arcuate path between the part-receiving and the welding positions in a manner such that the weldable part is provided a slight wiping action as it contacts the workpiece prior to being welded thereto. This assures an effective electrical contact between the part and the workpiece.

Also in accordance with the invention, the welding tool is equipped with an electrode designed to contact the workpiece and complete a circuit for the welding power. The electrode is spaced from the chuck leg of the tool and is movable independently thereof. Further, the chuck of the welding tool is equipped with a movable stop which enables the weldable parts to be supplied thereto at the extremely high rates of welding achievable with the apparatus. Specifically, the movable stop constitutes a pivotable gate located at the end of a part-receiving portion of the chuck, which gate is spring loaded and yields as a part is moved into and slightly beyond the welding position with respect to the chuck. The movable stop then gently moves the weldable part back to the exact welding position relative to the chuck. This assures accurate positioning of the parts even with extremely rapid feeding, with the inertia of the weldable part effectively overcome by the stop.

It is, therefore, a principal object of the invention to provide apparatus for rapidly welding parts to workpieces.

Another object of the invention is to provide apparatus for welding parts to workpieces with the movement of the apparatus and the supply of weldable parts thereto being controlled entirely by mechanical means.

Still another object of the invention is to provide apparatus for welding parts at a high rate with a unique chuck for yieldably receiving the parts to be welded.

A further object of the invention is to provide apparatus for welding parts to workpieces with a welding tool moved between a part-receiving position and the workpiece in an arcuate path, to provide a wiping action between the part and the workpiece.

Still a further object of the invention is to provide apparatus for welding studs which includes a chuck leg and an electrode independently mounted in the same welding tool body.

Other objects and advantages of the invention will be apparent from the following detailed description of a preferred embodiment thereof, reference being made to the accompanying drawings, in which:

FIG. 1 is a view in perspective of overall apparatus embodying the invention;

FIG. 2 is a fragmentary side view, with parts broken away and with parts in section, of a mechanical controller and a feeding device of the apparatus of FIG. 1;

FIG. 3 is a sectional view taken generally along the line 3–3 of FIG. 2;

FIG. 4 is a side view with parts broken away and with parts in cross section, of the mechanical controller;

FIG. 5 is a vertical sectional view taken centrally through a welding tool of the apparatus of FIG. 1 and also showing portions of links used to support and move the tool;

FIG. 6 is a view in vertical cross section taken along the line 6–6 of FIG. 5;

FIG. 7 is an enlarged rear perspective view of the chuck shown in FIGS. 5 and 6;

FIG. 8 is a view in vertical cross section taken along the line 8–8 of FIG. 5;

FIG. 9 is a view in elevation, with parts broken away and in cross section, of components for controlling power supplied to the welding tool;

FIG. 10 is a schematic diagram showing the manner in which the components of FIG. 9 are connected to the tool;

FIGS. 11—14 are schematic views in left side elevation of the welding tool and associated components during a welding cycle when feeding a part to the tool and welding the part to a workpiece; and FIG. 15 is a somewhat schematic, fragmentary side view of the feeding device of FIG. 2 and further showing a tab stack support of the device.

Referring more particularly to FIG. 1, apparatus in accordance with the invention is shown specifically as applied to welding opening tabs to scored can lids for the purpose of opening cans to which the lids are applied without requiring can openers. Can lids to which the tabs are welded are indicated at 20 and preferably have spiral scores thereon to form opening strips as shown more particularly in a copending application of Robert W. Murdock, Ser. No. 491,154. The lids are moved with a rapid, intermittent motion by a conveyor schematically indicated at 22 at a rate of 250—300 lids per minute, for example. Opening tabs 24 are shown in FIGS. 1, 3, 5, and 8 and are welded to the lids 20 at a corresponding rate of 250—300 welds per minute. The tabs 24 have projections 26 (FIGS. 3 and 8) which are welded to end portions of the scored strips on the can lids 20. The tabs also can be equipped with suitable reinforcing ribs or ridges 28, as shown in FIGS. 3, 5, and 8.

The overall apparatus of FIG. 1 basically includes a drive motor 30, a suitable speed control 32, a mechanical welding controller 34, a welding tool 36, and a feeding device 38. The welding apparatus can be included as part of an overall machine which also stamps the lids and tabs. In that instance, other drive apparatus of the overall machine can be substituted for the motor 30 and the speed control 32.

WELDING TOOL

The welding tool 36 is shown in more detail in FIGS. 5 and 6. The tool 36 includes a housing 40 slidably carrying a chuck leg 42 by means of sleeve bearings 44. The chuck leg 42 is insulated from the housing by a sleeve 46 which has a groove 48 therein to receive a tang 50 of a collar 52 affixed to the chuck leg 42. In this manner, the chuck leg 42 always remains in a fixed position relative to the tool. The collar 52 also forms a seat, along with a shoulder 54 of the insulating sleeve 46, for a plunge spring 56. The plunge spring urges the chuck leg 42 downwardly and outwardly of the housing 40 to the extent permitted by an upper adjustable stop 58. A suitable nut 60 on top of the stop 58 provides a terminal connection for a conductor by means of which power is supplied to the chuck leg 42. The lower end of the chuck leg 42 is threaded to facilitate the attachment of a chuck 62, the details of which will be discussed subsequently.

A lifting link 64 connects the upper end of the chuck leg 42 to a lifting pin 66 of insulating material, relative to which pin the link 64 can be adjusted by a separate screw and nut assembly 68. The lifting pin 66 extends downwardly through a rear extension 70 of the housing 40 and is effective to retract the chuck 62 and the leg 42 from the workpiece or can lid when the pin 66 is pushed upwardly by means to be subsequently described.

In most instances, it has been common to connect the power supply to the weldable part by means of the chuck leg and to connect the power supply to the workpiece by a separate terminal attached thereto. In this instance, however, power is supplied to the workpiece through a separate electrode 72 which can be supported similarly to the chuck leg 42, being slidably mounted by bearings 74 in a sleeve 76. A collar 78, which can also have a tang for orienting the electrode if desired, provides one seat and a sleeve shoulder 80 provides a second seat for a spring 82. The upper end of the electrode 72 has a stop member 84 and a nut 86 threadedly mounted thereon to receive a conductor for supplying power through the leg 72 to the workpiece. An adjustable tip 88 is threadedly engaged on the lower end of the electrode 72 and is moved into contact with the workpiece at the same time as the weldable part 24 to establish an electrical path from the conductors through the chuck leg 42 and the electrode 72, through the chuck 62 and the tip 88, and through the weldable part 24 and the workpiece, when in contact. In this instance, when the tabs are welded to steel can lids, the polarity of the power preferably is opposite to that normally employed in welding operations of this type.

WELDING CHUCK

The chuck 62 must be capable of receiving the weldable parts 24 at a rapid rate and securely hold them in the proper position. The chuck 62 includes a magnet 90 of circular cross section threadedly engaged on the lower end of the chuck leg 42. A chuck block or body 92 is affixed to the magnet, as by a press fit, and has a part-receiving portion 94 including a longitudinally-extending shallow groove or recess (FIG. 7) to assure clearance for the longitudinal ribs 28 of the tab. The weldable part 24 is fed longitudinally from the rear with a pair of side guides 96 and 98 facilitating movement of the tab to the part-receiving portion 94 of the chuck. When the part is positioned relative to the chuck, it is held by the magnet 90 during the welding operation.

Being fed to the chuck 62 at rapid rates, the weldable parts have considerable inertia when moved rapidly to the part-receiving portion 94. This renders the parts extremely difficult to control and to position accurately relative to the chuck. However, in accordance with the invention, the problem of proper positioning of the parts is overcome by means of a yieldable stop or gate 100 movably supported at the front of the chuck. As show, the gate is pivotally mounted by ears 102 and a pin 104 at the front end of the chuck body 92 and the portion 94. The stop 100 extends downwardly below the surface of the portion 94 sufficiently to engage the nose end of the part 24 when moved through the part-receiving portion and urged slightly beyond the end thereof. When engaging the part, the stop swings outwardly slightly as shown in dotted lines in FIGS. 6 and 8 against the force of a spring 106 held under tension between a tab 108 of the stop 100 and a pin 110 mounted on the body 92. The stop 100 thereby brings the weldable part 24 to a stop and then urges it back to the proper welding position with the nose of the part aligned with the forward end of the portion 94. The part is then held by the magnet 90 until welded to the workpiece, at which time the fore of the magnet 90 is overcome as the chuck is retracted and the part remains welded to the workpiece.

While the chuck 62 is effective in handling the weldable parts 24, occasionally a part will be dropped from the chuck or the supply of weldable parts will be exhausted with the result that the chuck will move downwardly into welding position with no weldable part carried thereby. In such an instance, the pilot and welding arcs would ordinarily be struck between the chuck and the workpiece causing burning of the chuck and early replacement thereof. To overcome this, inserts 112 and 114 are mounted in the chuck by cutting away portions thereof and by mounting the inserts 112 and 114 therein but separated from the chuck body by insulating layers 116. The inserts 112 and 114 are positioned in locations such that they are the only portions of the chuck which will contact portions of the workpiece if no weldable part is carried thereby. Being insulated from the body, the inserts will prevent a conducting path from being formed between the chuck and the workpiece, with the result that no welding arc will be established. By using the insulating layers 116 between the inserts 112 and 114 and the chuck block 92, the inserts need not be made of insulating material but can be of longer wearing metal.

FEEDING DEVICE

While the chuck 62 must receive and position the oriented parts rapidly, they must also be fed to the chuck rapidly. For this purpose, the feeding device 38 includes a block 118 (FIG. 2) which forms a horizontally-extending guide passage 120 for a slide 122, and also forms a vertical supply passage 124 to receive a stack of the parts 24 arranged horizontally and partially nesting with one another in the stack. The slide 122 has a recess or offset portion 126 (FIG. 6) to receive the part 24 and an offset or shoulder 128 which engages the rear end of the lowest part 24 (FIG. 2) and carries it to the chuck 62 as it moves outwardly in the guide passage 120. The offset portion 126 of the slide 122 preferably is slightly longer than the weldable part 24 and moves outwardly sufficiently far to cause the part 24 carried thereby to engage the stop 100 and move it outwardly slightly. When the slide retracts to receive the next part, the stop 100 then pushes the newly deposited part rearwardly slightly to the proper welding position.

The parts and specifically the tabs 24 can be fed to the passage 124 in any suitable manner, as long as they are properly oriented with the nose end toward the welding tool 36. It has been found that if the stack in and above the passage 124 is sufficiently high, it is sometimes difficult for the slide 122 to engage and push the lowest tab 24 outwardly to separate it from the stack. To overcome this, a plunger, to be discussed subsequently, can clamp an intermediate portion of the stack of tabs and thereby relieve the weight and pressure of those above. Alternately, a blade can be carried by the block 118 and be moved inwardly between two of the tabs spaced a few tabs above the lowest one so as to remove the weight of the stack of tabs from the lowest one temporarily

MECHANICAL WELDING CYCLE CONTROL

The operations of the welding tool 36 and the feeding device 38 must be carefully and closely controlled to achieve the rapid welding rate. Lack of coordination between the various operations of the cycle can either extend the cycle unduly long or cause interference and damage of the various components. Accordingly, the mechanical controller 34 for accomplishing this purpose will now be discussed in detail.

A. Welding Tool Drive

The drive for the welding tool 36 will be discussed first. The welding tool body 40 has a pair of pivot pins 130 and 132 (FIG. 5) extending therefrom toward the controller 34. An upper link 134 (FIG. 2 also) is pivotally connected to the pivot pin 130 and a lower, curved link 136 is pivotally connected to the pivot pin 132. The opposite end of the upper link 134 is pivotally connected to a supporting shaft 138 rotatably held by the controller 34 while the opposite end of the lower link 136 is supported by a rotatable shaft 140 also rotatably held by the controller 34. The links 134 and 136 functionally are parallel links with the pins 130 and 132 and the shafts 138 and 140 being equally spaced and located on parallel lines. As shown, the lower link 136 is curved only for clearance purposes when in its lower position.

As shown in FIG. 2, an arm 142 is affixed to the shaft 138 and, by a pin 144, is pivotally connected to a spring rod 146. The rod 146 extends through a passage 148 in a guide and support bar 150 which is pivotally supported by the sidewalls of the controller 34. A return spring 152 is positioned around the rod 146 and is maintained under compression between a seating ring 154 backed up by the bar 150 and a seating ring 156 backed up by a nut 158 on the end of the rod 146. The spring 152 thereby urges the arm 142 and the shaft 138 in counterclockwise directions so as to urge the welding tool 36 to the upper position.

Referring to FIG. 4, the lower, drive shaft 140 for the tool 36 has a drive arm 160 affixed thereto with a pivot pin 162 connecting the arm to an intermediate drive link 164. The link 164, in turn, is pivotally connected by a pin 166 to an L-shaped drive lever 168. The lever 168 has a lower end pivotally supported by a pin 170 with an intermediate portion rotatably carrying a cam follower 172 on a stub axle 174. The cam follower 172 is urged against a first cam 176 mounted on a drive shaft 178 which is rotated in a clockwise direction by the speed regulator 32 to the motor 30. The cam follower 172 is maintained in contact with the cam 176 by virtue of the return spring 152 which urges the shaft 138, and, consequently, the shaft 140 in a counterclockwise direction so as to urge the cam follower against the cam through the intermediate link 164.

B. Chuck Drive

The above drive arrangement moves the welding tool up and down between the part-receiving and welding positions. The control for retracting the chuck during an actual welding cycle will now be discussed. When the welding tool is in the lower, welding position, the lifting pin 66 is engaged by an adjustable screw 180 (FIGS. 2 and 6) of a lifting arm 182. The arm 182 is mounted on a drive shaft 184 which extends into the control housing. The shaft 184, as shown in FIGS. 2 and 3, has an intermediate tang 186 affixed thereto which is urged forwardly by a spring 188 mounted between the upper end of the tang 186 and a suitable seat 190. The lifting arm 182 thereby is normally urged toward its lower position. At the end of the shaft 184 is a drive arm 192 (FIGS. 3 and 4) which is engaged by a pushrod 194 supported and guided in a bracket 195 and moved longitudinally by a second, lifting cam 196. The cam 196 has a relatively sharply rising portion 198 which moves the rod 194 forwardly to turn the drive arm 192 in a counterclockwise direction and cause the lifting arm 182 to raise the chuck 62 relative to the tool body 40 and retract the chuck from the workpiece. The cam 196 also has a sharp offset 200 which enables the arm 182 to drop suddenly by the force of the spring 188 and enables the chuck and a weldable part carried thereby to be plunged back against the workpiece by means of the spring 56.

C. Feeder Drive

The controller 34 also must be capable of operating the feeding device 38 to supply a weldable part to the workpiece at the proper time when the welding tool is in the upper, part-receiving position. For this purpose, the feed slide 122 is connected by a suitable link 202 and an arm 204 (FIGS. 2 and 3) to a feed drive shaft 206. An arm 208 is affixed to the shaft 206 within the controller and, in turn, is connected through a link 210 to a cam follower lever 212. The lever 212 is pivotally held by an axle 214 extending across the controller and rotatably carries a cam follower 216 above the link 210. The opposite end of the lever 212 is pivotally connected to a spring rod 218 which extends through a pivot block 220 and carries a spring 222 under compression between the block 220 and an outer seating ring 224. The spring thereby urges the lever 212 in a clockwise direction and urges the follower or roller 216 against a third, feed cam 226. As the cam 226 rotates, it oscillates the drive shaft 206 and causes the slide 122 to move from a retracted position in which it receives the parts to a forward position in which it supplies the parts to the chuck, then returning to the first position by means of the spring 222.

D. Welding Power Control

In accordance with the invention, the power for the welding cycle is also controlled in part by mechanical means. Referring to FIG. 9, a switch rotor 228 is mounted on the main drive shaft 178 just outside the controller 34. The rotor 228 carries a conducting sector 230 which conducts electricity and controls suitable welding circuitry, depending on its position. An annular brush housing 231 is mounted on the controller and carries, in this instance, three brushes or contacts 232, 234, and 236 which contact the outer surface of the rotor 228, and the sector 230 when in the appropriate position.

As shown schematically in FIG. 10, as the drive shaft rotates and moves the sector 230 clockwise, it first completes a pilot arc circuit between contacts 232 and 234 to enable a pilot arc to be established between the weldable part and the workpiece when in the appropriate positions through a pilot arc circuit. As the sector rotates further, it electrically connects the contacts 234 and 236 to establish the main welding arc between the weldable part and the workpiece through a welding arc circuit. This contact preferably occurs as the stud begins its plunge stroke. The welding arc is superimposed on the pilot arc since the contacts 232 and 234 are still electrically connected. The contacts 234 and 236 preferably remain electrically connected until at least the time that the part is plunged back into contact with the workpiece.

WELDING OPERATION

The overall feeding and welding cycle will now be discussed in more detail. With the chuck 62 in the upper position and the slide 122 in the rear, part-receiving position, as shown in FIG. 2, the shaft 206 is rotated in a clockwise manner to cause the link 202 and the arm 204 to move the slide forwardly toward a position immediately below the chuck. As the slide moves forwardly, the offset 128 catches the lowermost part from the stack and carries it forwardly to the position under the chuck, shown in FIG. 11. Actually, the slide is caused to move slightly beyond this position to a point where the nose of the part carried thereon engages the resilient stop 100 and moves it outwardly slightly, approximately as shown in dotted lines in FIG. 8. The spring 222 then causes the slide to retract to the position of FIG. 2 again as it moves the shaft 206 in a counterclockwise direction. As the slide retracts, the resilient stop 100 moves to its original position and nudges the weldable part 24 back to the proper welding position, relative to the chuck.

With the part in proper position and the slide retracted, continued rotation of the drive shaft 178 causes the welding tool 36 to move downwardly to the position of FIG. 12. This is accomplished by the first cam 176 causing the shaft 140 to rotate clockwise and move the lower link 136 downwardly, along with the upper link 134. Because of the parallel arrangement of the link pivot pins 130, 132 and 138, 140, the welding tool 36 remains in a vertical position as it moves downwardly. However, the path of the welding tool is arcuate, as shown in FIG. 12. After the projection 26 of the weldable part 24 initially contacts the workpiece, at which time the chuck and tool body are in the positions shown in dotted lines in FIG. 12, the welding tool body 40 continues to move downwardly slightly further and cause the spring 56 (FIGS. 5 and 6) to compress slightly as the tool body moves downwardly relative to the chuck leg 42. At the same time, the spring 82 for the electrode 88 is compressed slightly. Because the tool continues to move in the arcuate downward path between the time the springs 56 and 82 begin to compress and the tool body 40 finally stops, the welding part projection 26 and the electrode tip 88 are wiped or slide across the workpiece slightly, about one-sixteenth inch in practice. This wiping action is important in assuring effective electrical contact between the projection 26 and the workpiece 20 and also between the electrode tip 88 and the workpiece 20. However, the tool can also be provided with a conventional rectilinear motion, if desired.

After the weldable part and the electrode tip 88 come to rest relative to the workpiece, the second, lift cam 196 comes into operation upon continued rotation of the drive shaft 178. The rising portion 198 of the cam 196 pushes the rod 194 forwardly to move the shaft 184 in a counterclockwise direction, as shown in FIG. 4. The lifting arm 182 then raises the lifting pin 66 and causes the chuck leg 42 and the chuck 62 to retract from the workpiece 20.

The rotor 228 is positioned so that the sector 230 electrically connects the contacts 232 and 234 immediately prior to the projection 26 of the part 24 leaving the workpiece, so that a pilot arc potential is established at this time. Consequently, as the part retracts, a pilot arc is established between the part and the workpiece. As the part moves to or near its retracted position and as the rotor 228 rotates further, the main welding arc is established between the part and the workpiece as the sector 230 connects the contacts 234 and 236.

The offset 200 of the cam 196 then moves past the rod 194 which enables the spring 188 to move the shaft 184 in the opposite direction and drop the arm 182, thereby enabling the spring 56 to plunge the part 24 and the chuck 62 into contact with the workpiece. The welding arc preferably is maintained from about the time the plunge starts until contact between the projection 26 of the part and the workpiece 20. This can be accomplished by appropriately positioning and designing the conducting sector 230 and the contacts so that the contacts for the welding arc remain closed at least until the stud contacts the workpiece. If a capacitor power source or similar power source of generally predetermined, short duration is employed, the electrical connection between the contacts 234 and 236 is less critical and they can remain closed long after the stud and workpiece are in contact and the short power source pulse has dissipated in the electric arc.

After the part is plunged against the workpiece and the projection 26 is welded to the workpiece, the welding tool is raised from the position shown in FIG. 14 to the position of FIG. 2, with the welded connection between the part and the workpiece overcoming the tendency of the magnet 90 to retain the part. Hence, when the welding tool reaches the upper position, the chuck 62 is empty and is ready to receive another weldable part. As the welding tool is moved to its upper position, suitable means not constituting part of the invention can be used to move the next workpiece 20 into welding position under the chuck.

The slight wiping action between the chuck and the welded part as the welding tool is raised can also facilitate separation of the magnetic chuck and the part.

Because the tabs 24 are often stacked to a considerable height above the feeding device 38, and because the tabs nest together when stacked, due to the cooperation of the projections 26 and also of the reinforcing ribs 28, it is sometimes difficult to push the lowermost tab forwardly from under the stack by means of the offset 128 of the slide 122. To overcome this, as shown in FIG. 15, a plunger 238 can clamp a plurality of the tabs 24 at an intermediate portion of the stack against the opposite wall of the stack passage 124 to enable these tabs to support their weight and the pressure of those thereabove. The relatively few tabs therebelow then apply relatively little pressure to the lowermost tab when it is engaged by the offset 128 and is moved forwardly by the slide 122.

The plunger 238 is moved forwardly before the slide 122 has moved to its fully retracted position to clamp the stacked tabs before the offset 128 has moved to the rear of the stack passage. Consequently, when the slide is fully retracted and the offset is to the rear of the stack, the tabs in the lower part of the stack below the plunger 238 drop down independently of those clamped by the plunger and those above, with the lowermost one then being ready for engagement by the offset 128 upon the next forward movement of the slide 122. The plunger 238 is retracted clear of the stack, while the offset 128 is forward of the stack to enable the upper part of the stack to drop downwardly the thickness of one tab before the stack is clamped again.

While the plunger 238 can be driven by a variety of means, as shown, the plunger 238 is held in a guide or track 240 for movement toward and away from the stack and is urged toward the stack by a spring 242 coiled around an adjusting rod 244. The rod 244 is screwed into a pivot block 246 which is pivoted to a bellcrank 248 having a fixed pivot 250. The other end of the bellcrank is connected through an adjusting rod 252 to a lever 254. The lever 254 has an intermediate pivot 256 supported by the wall of the controller 34 and has an opposite end engageable with a cam 258. The cam 258 can be mounted on the shaft 206 which drives the linkage arrangement for the slide 122, with the cam 258 being suitably shaped to move the plunger toward the stack against the force of the spring 242 to provide the above-described movement for the plunger 238.

Various modifications of the above-described embodiment of the invention will be apparent to those skilled in the art, and it is to be understood that such modifications can be made without departing from the scope of the invention, if they are within the spirit and tenor of the accompanying claims.

I claim:

1. Apparatus for welding a part to a workpiece comprising a welding tool including a body, a chuck leg carried for longitudinal movement by said body, resilient means urging said leg out of said body toward the workpiece, a chuck for holding a weldable part connected to an outer end of said leg, means connected to said body for guiding said body in a path between a first position remote from the workpiece and a second position in which a part carried by said chuck is in contact with the workpiece, a part-carrying member for moving a part from a source of supply to said chuck, means for guiding said member in a path between the source of supply and said chuck when in the first position, a drive shaft, first means affixed to said drive shaft, mechanical means connecting said first means and said tool body guide means for moving said tool body between he first and the second positions, second means affixed to said drive shaft, mechanical means connecting said second means and said chuck leg for moving said chuck between the second position in which a part carried by the chuck is in contact with the workpiece and a third position in which said chuck and the part are retracted a predetermined distance from the workpiece, third means affixed to said drive shaft, mechanical means connecting said third means and said member for moving said member between the source of supply and said chuck, said first, second, and third means and said mechanical means being arranged to operate said welding tool, said chuck, and said member in a predetermined sequence, and means for rotating said drive shaft.

2. Apparatus according to claim 1 further characterized by a rotor on said drive shaft, conducting means carried by a portion of said rotor, and contacts slidably engageable with said rotor to control power to said chuck and the workpiece.

3. Apparatus according to claim 1 characterized further by additional means carried by said drive shaft, and means engageable with said additional means for controlling power to said chuck and the workpiece.

4. Apparatus according to claim 1 wherein said first, second, and third means are cams.

5. Apparatus for affixing opening tabs to can lids at high rates of speeds, said apparatus comprising a welding tool having a tool body, a chuck leg held for movement by said tool body and having an outer end extending beyond said body, means for supplying power to said chuck leg, a chuck carried at the end of said chuck leg and having a portion to receive the opening tabs, resilient means carried by said tool body for urging said chuck leg to an outer position, means for supporting can lids in alignment with said chuck, a rotatable drive shaft, mechanical means driven by said drive shaft for moving said welding tool body from a tab-receiving position to a welding position in which a tab carried by said chuck is in contact with a can lid, mechanical means driven by said drive shaft for moving said chuck leg relative to said tool body to move said chuck from a position in which an opening tab carried thereby is in contact with said can lid to a retracted position in which said chuck and the tab are in a position remote from said can lid, a tab-carrying member, means for guiding said member between a position in which said member receives an opening tab from a source of supply to a position in which said member moves the tab into welding position on said chuck, mechanical means driven by said drive shaft for moving said member between said positions, said drive shaft being effective to coordinate movement of said tool body, said chuck, and said tab-carrying member for supplying a tab to said chuck when said chuck is in the tab-receiving position, and for moving said chuck and the tab to the retracted position when said body is in the welding position.

6. Apparatus according to claim 5 characterized by said source of supply constituting a stack of said tabs, a plunger, means for supporting said plunger for movement toward and away from an intermediate portion of the stack, said drive shaft causing movement of said plunger between a first position in which it engages at least one tab at an intermediate portion of said stack to support the tabs thereabove and a second position clear of the stack.

7. Apparatus for welding a part to a workpiece comprising a welding tool including a body, a chuck leg carried for movement relative to said body and having an end extending out of said body, means urging said leg toward the workpiece, a chuck for holding a part connected to the outer end of said leg, means connected to said body for supporting and guiding said body between a first position remote from the workpiece and a second position in which a part carried by said chuck is in contact with the workpiece, first mechanical means connected to the last-named means for moving said body between said positions, second mechanical means for retracting said leg and said chuck when in the second position with the part in contact with the workpiece, said second mechanical means including lifting means connected to said chuck leg and means engageable with said lifting means when said body is in the second position, a part-carrying member, means for supporting and guiding said member between a part-receiving position remote from said chuck and a part-supplying position adjacent said chuck, third mechanical means connected to the last-named means for moving said member between its positions, and movable drive means for driving and coordinating operation of all three of said mechanical means to cause said part-carrying member to move to the part-supplying position to supply a part to said chuck only when said body is in the first position, and to cause said engageable means to engage and lift said lifting means to retract said leg and said chuck after said body is in the second position for a predetermined period.

8. Apparatus for welding parts to workpieces at a high rate of speed, comprising a welding tool including a body, a chuck leg carried for longitudinal movement in said body and having an end extending out of said body, spring means urging said leg out of said body toward the workpiece, a chuck for holding a part connected to the outer end of said leg, stationary support means, a pair of links connected between said support means and said body, mechanical means for driving at least one of said links for moving said body in an arcuate path between a first position remote from the workpiece and a second position in which a part carried by said chuck is in contact with the workpiece, means for retracting said leg and said chuck in a lineal path when in the second position with the part in contact with the workpiece, said retracting means comprising lifting means connected to said chuck leg, and means engageable with said lifting means when said body is in the second position, said mechanical means also including means for moving said engageable means independently of said body to retract said leg and said chuck a predetermined distance and to enable said spring means to plunge said chuck and said leg back toward the workpiece after a predetermined period of time.

9. Apparatus according to claim 8 characterized by said means from moving said engageable means further comprising a cam, and means including a cam follower connected between said cam and said engageable means for moving said engageable means when said cam is rotated.

10. Apparatus according to claim 8 characterized by a shaft for pivotally moving said links, a cam, and means including a cam follower connected to said shaft for pivoting said links to raise and lower said welding tool body.

11. Apparatus according to claim 8 characterized by means for feeding parts to said chuck when said tool is in the first position comprising a slide, means for directing said slide in a path having a position adjacent said chuck and a retracted position, means for maintaining a stack of parts in alignment with said slide when in the retracted position, and said mechanical means including means for moving said slide from the retracted position to the position adjacent said chuck to feed a part to said chuck.

12. Apparatus according to claim 11 characterized by connecting means connected to said slide, a shaft for moving said slide connecting means, a cam, and means including a cam follower connecting said cam and said shaft to pivot said shaft and cause said slide to move between the two positions.